United States Patent [19]
Green

[11] Patent Number: 4,616,840
[45] Date of Patent: Oct. 14, 1986

[54] MACHINE FOR UTILIZING ENERGY

[76] Inventor: Francis H. Green, 97 Lawrie Park Gardens, London, England, SE26 6HW

[21] Appl. No.: 619,115

[22] Filed: Jun. 11, 1984

[30] Foreign Application Priority Data

Jun. 11, 1983 [GB] United Kingdom ............... 8316073
Jan. 10, 1984 [GB] United Kingdom ............... 8400575

[51] Int. Cl.⁴ ........................................... B62M 1/12
[52] U.S. Cl. ................................. 280/234; 280/240; 280/246; 280/252; 280/270; 272/73
[58] Field of Search ............... 280/223, 224, 233, 234, 280/238, 240, 244, 246, 247, 252, 253, 270; 272/72, 73

[56] References Cited

U.S. PATENT DOCUMENTS

| 593,975 | 11/1897 | Ernst | 280/233 |
|---|---|---|---|
| 644,685 | 3/1900 | Rowlands | 280/233 |
| 2,788,211 | 4/1957 | Ivanoff | 272/73 |
| 4,437,677 | 3/1984 | Ksayian | 280/234 |

FOREIGN PATENT DOCUMENTS

| 10200 | 3/1896 | Belgium | 280/233 |
|---|---|---|---|
| 2436774 | 2/1976 | Fed. Rep. of Germany | 280/237 |
| 466614 | 5/1914 | France | 280/233 |
| 890534 | 2/1944 | France | 280/234 |

Primary Examiner—John J. Love
Assistant Examiner—Charles R. Watts
Attorney, Agent, or Firm—Holman & Stern

[57] ABSTRACT

A machine for utilizing muscular energy is disclosed which can be driven, through separate operating means, by movement of a user's legs and by upper body (i.e. arms and torso) movement. The movement of the legs and the upper body movement need not be synchronized, and each part of the user's body can work at the rate most suited to it.

A bicycle with a driven rear wheel is a typical example of such a machine. Both of the separate operating means can be arranged to drive a common spindle so that the power applied to the spindle is greater than would be the case in a conventional bicycle where only leg power is applied in driving the machine.

10 Claims, 11 Drawing Figures

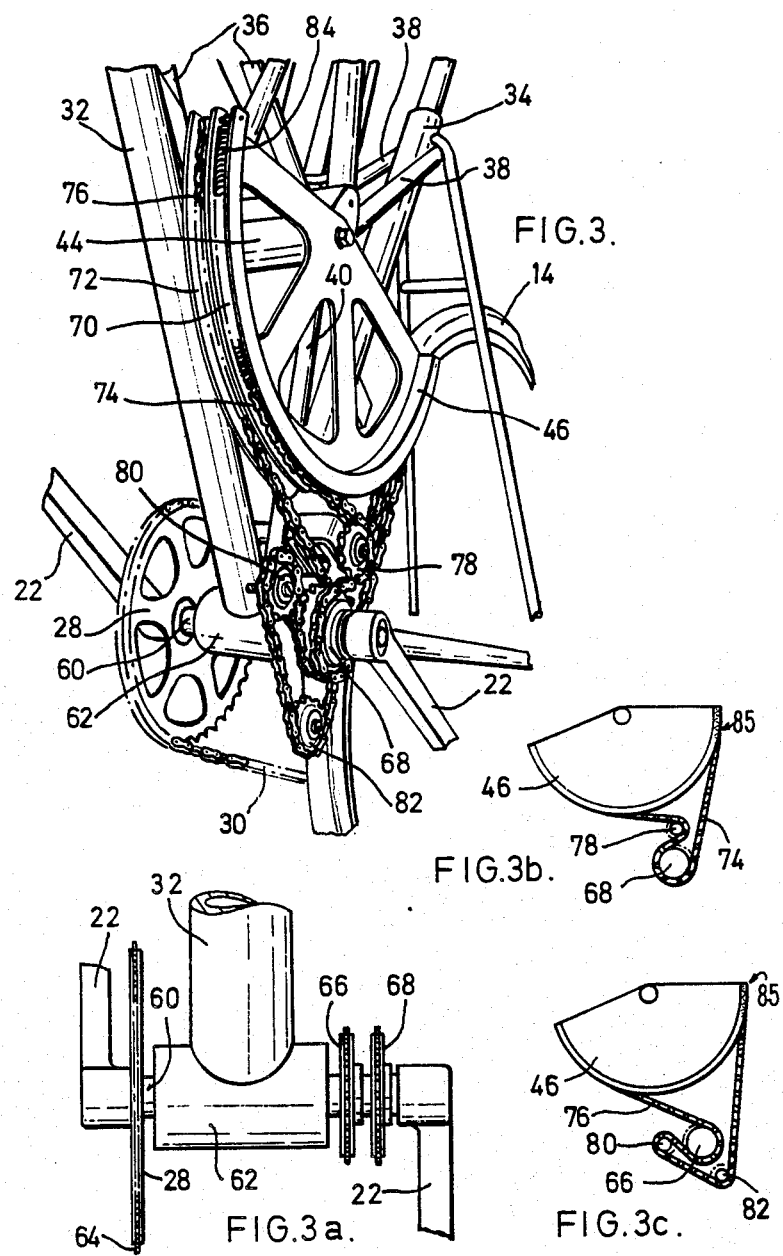

MACHINE FOR UTILIZING ENERGY

FIELD OF THE INVENTION

This invention relates to a machine for utilizing muscular energy. An example of a machine to which the invention can be applied is a bicycle.

BACKGROUND OF THE INVENTION

It is known to use leg power to drive a machine such as a bicycle. However in the conventional arrangement, power is provided virtually by the legs alone, and the rest of the muscular energy which the body has available is unused.

As a result, the machine is not driven as hard as might be the case if all the muscular energy of the user were harnessed. Furthermore, one of the attractions of bicycling is that it provides exercise to the body. On a conventional bicycle, this exercise is generally limited to the legs.

It is known from British Patent Specification No. 1 469 363 to provide a single operating member which can be acted upon both by the arms and the legs. The problem with this however is that both arms and legs are forced to move at the same speed and in the same rhythm, and this is not comfortable for the user and is not efficient in applying muscle power from different muscular sources.

SUMMARY OF THE INVENTION

According to the present invention, there is provided a machine for utilizing muscular energy, the machine comprising means for supporting the body of an operator, an output member in the form of a rotatable spindle, first operating means to be driven by the operator's legs to turn the spindle, and second operating means to be driven by upper body movement also to turn the spindle, movement of the first operating means being independent of movement of the second operating means.

The fact that the first and second operating means are independent means that the user can choose the amount and rate of effort that he applies through upper body movement, and can in fact drive the machine using leg power only, with the second operating means being undriven. Thus, in the case of a bicycle, more power may be applied for going up hills or for bursts of speed and less power can be applied for leisurely progress on the flat. It is of course possible to apply maximum power at all times to make very fast progress.

The second operating means is preferably adapted to be gripped by the hands and to be driven by a combination of to-and-fro torso movement and arm movement. Experience has shown that most power is in practice derived from movement at the waist, and a circular movement, in three dimensions, of the lumbar region takes place. This is extremely therapeutic, particularly for people who are prone to ailments of the lower back and for people who spend a lot of time sitting at a desk.

The second operating means may comprise a set of handlebars which are pivoted about a horizontal axis so that they can be moved in a vertical arc to supply drive to the machine. In the case of a bicycle, the handlebars may also be used to steer the front wheel, and a steering linkage will then be required, between the handlebars and the front bicycle wheel.

Preferably, the handlebars are connected to their horizontal pivot axis through a parallelogram linkage, so that they remain in the same orientation throughout the range of their operating movement.

The steering linkage preferably comprises a cable linkage between the handlebars and the front wheel forks. In one embodiment, a pair of Bowden cables are used and in another embodiment, a continuous cable is tensioned around pulleys at the horizontal pivot axis of the handlebars, so that the tension in the cable remains the same irrespective of the position of the handlebars.

The first operating means may comprise a pair of pedals arranged conventionally on cranks which extend in radially opposite directions at either end of a main spindle.

BRIEF DESCRIPTION OF THE DRAWINGS

The invention will now be further described, by way of example, with reference to the accompanying drawings, in which:

FIG. 3 is a detail perspective view of the drive train of the bicycle shown in FIGS. 1 and 2;

FIG. 3a is a simplified illustration of the lower spindle;

FIGS. 3b and 3c are diagrammatic views of two parts of the drive train;

DESCRIPTION OF PREFERRED EMBODIMENTS

Figure 1:
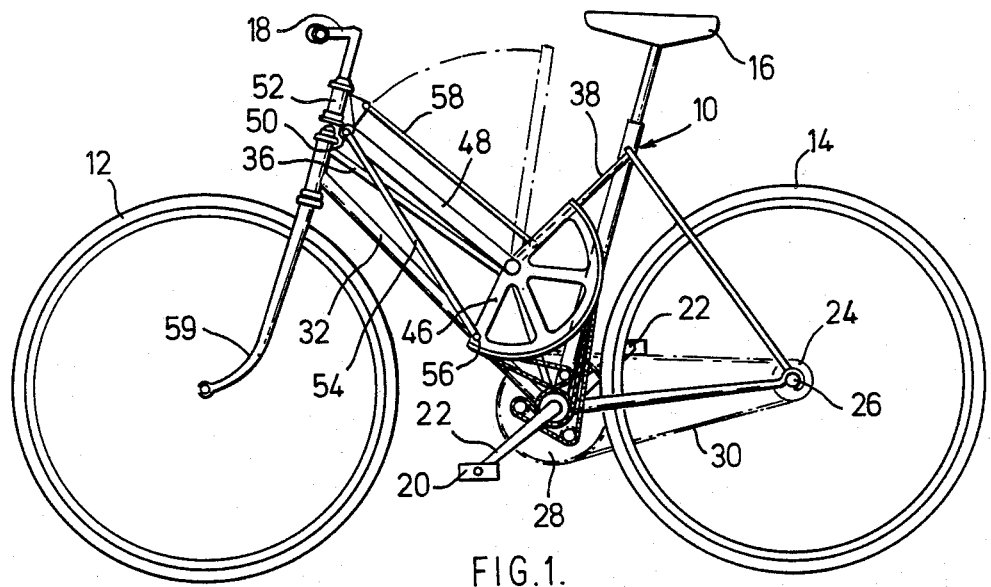
FIG. 1 shows a bicycle in accordance with the invention.

Although the invention is described here in relation to a bicycle, other applications of the invention are possible. One example of such other applications is an exercising machine.

The bicycle shown in the Figures is generally similar in configuration to a standard bicycle. There is a frame 10, a front wheel 12 and a rear wheel 14. A saddle 16 is mounted at one end of the frame and a set of handlebars 18 is mounted at the front. Pedals 20 on cranks 22 drive a sprocket 24 which is mounted on the hub 26 of the rear wheel 14, through a chain wheel 28 and a drive chain 30. With these components, the bicycle can be ridden conventionally.

Figure 2:
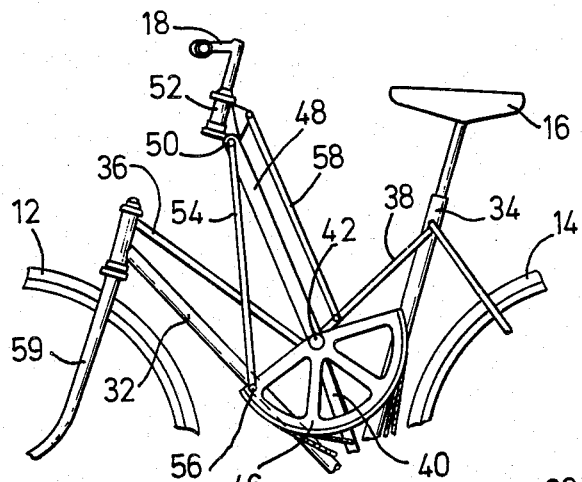
FIG. 2 is a view of parts only of the bicycle of FIG. 1.
Figure 2A:
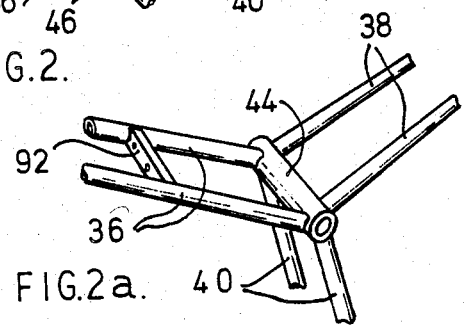
FIG. 2a is a fragmentary perspective view of the bicycle frame.

FIG. 2 shows some of the modifications which are made to provide a second operating means, driven by upper body movement. In addition to the main frame members 32 and 34, additional frame members 36 and 38 and 40 are provided to support a horizontal pivot bearing at 42. FIG. 2a is a fragmentary perspective view indicating how the additional frame members 36, 38 and 40 are arranged in pairs, the members of each pair going to opposite ends of a bearing support tube 44. The support for the bearing at 42 is therefore strongly triangulated back to the main frame members 32 and 34.

A part circular member or quadrant 46 is mounted on the bearing at 42, on one side of the frame, as can be seen in FIG. 3. Rotation of the quadrant about the axis of the bearing 42 results in drive being applied to the rear wheel 14 in a manner which will be described at a later stage in this specification. FIG. 2 however illustrates how the rotation of the quadrant is achieved.

A main linkage arm 48 is pivoted at one end 50 to the handlebar stem 52 and at its other end is attached to the quadrant on the pivot axis 42. A strut 54 is also attached between the one end 50 of the main linkage arm and a point 56 which is spaced from the axis 42. The presence of the strut 54 ensures that raising and lowering of the handlebars 18 leads to rotation of the quadrant. FIG. 1 shows, in chain-dotted lines, the uppermost position of the arm 48.

A parallelogram arm 58 extends parallel with the linkage arm 48, between a point on the handlebar stem 52 and a point on one of the additional frame members 38. As the handlebars are raised and lowered, the parallelogram arm 58 ensures that they remain in the correct orientation and are therefore easy for the user to grip.

For the sake of clarity, brake, gearchange and steering mechanisms have been omitted from FIGS. 1 and 2. Brake and gear change mechanisms will be conventional, using Bowden cables operated by levers on the handle bars or nearby. Special measures are needed for steering because, as can be seen in FIG. 2, the handlebar stem 52 is actually separated from the top of the front wheel forks 59.

FIGS. 3 and 3a show details of how rotation of the quadrant 46 leads to the transmission of drive to the rear wheel.

A main spindle 60 is journalled in a bottom bracket 62 of the frame 10. At one end, the chain wheel 28 and an associated pedal crank 22 are fixed to the spindle. The chain wheel 28 has sprocket teeth 64 on which the chain 30 engages. At the other end of the spindle, two identical sprocket wheels 66 and 68 are mounted, with the other pedal crank 22 being fitted outboard of the sprocket wheels 66 and 68.

The quadrant 46 has two side-by-side tracks 70 and 72, and a length of conventional bicycle chain is received in each track. The chains 74 and 76 in the tracks 70 and 72 are led around the sprockets of respective blocks 66 and 68 in opposite directions. Thus, as the quadrant rotates in one direction, one of the sprocket wheels 66 or 68 is transmitting drive while the other sprocket wheel is freewheeling against its ratchet. The manner in which this is achieved can be seen most clearly from FIGS. 3b and 3c which show schematically the paths of the chains 74 and 76 respectively.

The chain 74 (FIG. 3b) passes directly under the sprocket wheel 68 and an idler sprocket 78 is included in the chain path to increase the wrap angle of the chain on the sprocket wheel 68.

The chain 76 (FIG. 3c) passes over its sprocket wheel 66 in the opposite direction, and two idler sprockets 80 and 82 are provided to guide the chain in the correct path.

The idler sprockets 78, 80 and 82 will be supported on brackets fixed at convenient positions on the frame 10.

As a result of this arrangement, one or other of the chains 74 and 76 will always be driving the spindle 60. To keep the chains in tension, springs 84 and 85 are provided between the end of each chain and the quadrant track. Only one of these springs, spring 84, at the end of the chain 74, is visible in FIG. 3, as the spring on the chain 76 will be at the opposite end of the quadrant since tension comes on the chains from opposite directions. As seen in FIGS. 3b and 3c, the second spring 85 is schematically indicated in dotted outline (since, like spring 84, it is disposed within the track 70) attached to the chain 74. The attachment of chain 74 to the spring is similar to the attachment of the chain 74 to the spring 84 chain in FIG. 3.

Both the sprocket wheels 66 and 68 will act in the same direction and it will therefore be possible to propel the bicycle using the pedals without moving the handlebars. The quadrant 46 will remain stationary when this is done.

Figure 4:
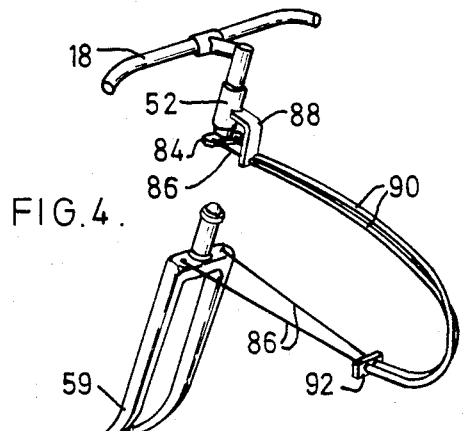
FIG. 4 is a schematic diagram of a steering system for the bicycle shown in FIGS. 1 and 2.

To steer the bicycle, the handlebars 18 are used in a conventional manner. A yoke 84 (see FIG. 4) is fastened to the bottom end of the stem 52, and the inner wires 86 of two Bowden cables are secured at one end to the yoke. A bracket 88 forms one abutment for the outer sleeves 90 of the wires, and a bracing piece 92 fixed to the frame (see also FIG. 2a) forms the other abutment. The other ends of the wires 86 are attached to the tops of the forks 59, with the cables crossing each other between their ends. Thus, turning the handlebars in one direction will turn the forks 59 in the same direction. The wires 86 should be tensioned to ensure that there is no play in the system.

Figure 5:
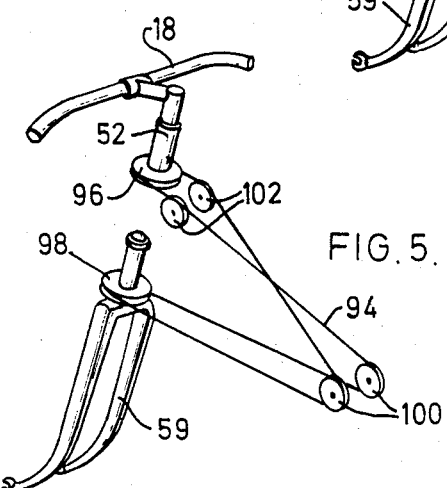
FIG. 5 is a schematic diagram of an alternative form of steering system.
Figure 6:
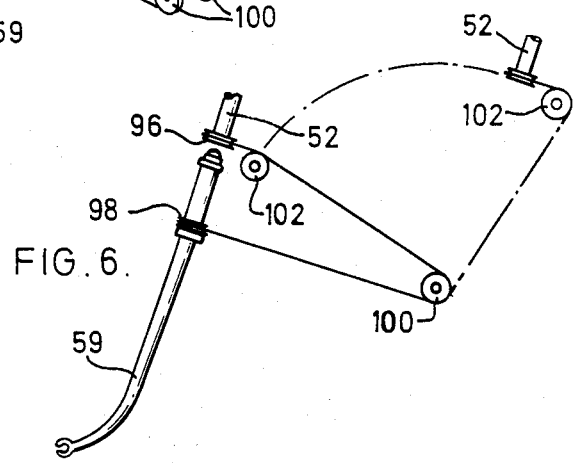
FIG. 6 is a side view of the steering system of FIG. 5.

An alternative steering mechanism is shown in FIGS. 5 and 6. This is again a cable operated mechanism. A continuous cable 94 is tensioned around pulleys 96 and 98 on the movable part 52 of the handlebar stem and on the top of the forks 59. There should be sufficient tension in the cable to ensure that the cable does not slip on the pulleys 96 and 98. The cable is led around a further set of pulleys 100 mounted at the pivot axis 42 of the linkage arm 48 and a set of pulleys 102 adjacent to the stem 52. The pulleys 100 and 102 ensure that the cable is correctly led to the pulleys 96 and 98, and the fact that the pulleys 100 are at the pivot point of the linkage arm 48 ensures that the path length for the cable does not alter as the handle bars are moved between the two alternative positions shown in FIG. 6. As can be seen in FIG. 5, the cable crosses itself at one point of its path so that the forks 59 move in the correct direction when the handlebars are turned.

It will be seen that the bicycle which has been described is built on the same lines as a conventional bicycle and it will therefore by easy for a rider familiar with conventional pedal bicycles to learn to ride it. Because more power can be applied to the spindle 60 to drive the wheels, the bicycle can be more highly geared than conventional bicycles, leading to higher speeds and/or much easier riding up hills.

Figure 7:
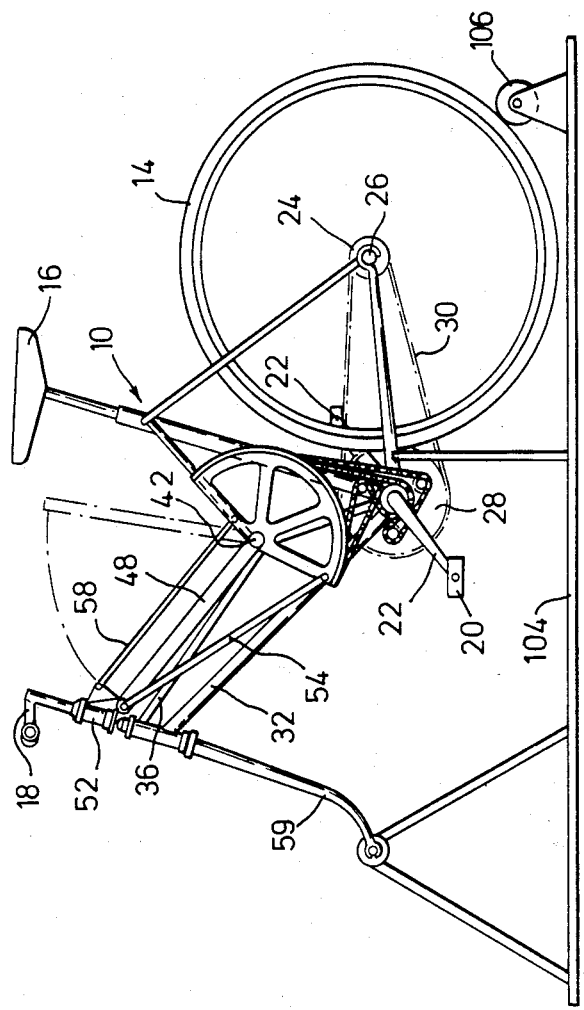
FIG. 7 shows the bicycle of the preceding figures in use as an exercise machine.

In addition to these virtues, riding the bicycle will be very good for the rider's physical well-being, because of the additional muscular movements (compared to the riding of a conventional bicycle) which are made. The bicycle described may also easily be converted to an exercise machine as shown in FIG. 7 simply by removing the front wheel and mounting the bicycle on a stand 104 with a resistance roller 106 in contact with the tyre on the back wheel. Known exercise machines have such resistance rollers, and many features known from the field of exercise machines can be incorporated into such a stand. Thus the bicycle described may double as a means of transport and as an exercising machine.

The invention can also be applied to a "dedicated" exercising machine for use only as an exercising machine, and many of the features described in connection with the bicycle could be carried over to such an exercising machine.

Additional springs (not shown) can be provided at the ends of the chains 74, 76 opposite to the springs 84. These additional springs will be much stiffer than the springs 84 and will serve to cushion the movement of the handlebars 18 by yielding a small amount when the quadrant 46 reaches the ends of its rotary movement. This helps to avoid jarring the rider's body. Furthermore, a secondary advantage arises from this modification, in that when the bicycle is pushed backwards (it is not possible to wheel it backwards) the additional springs are put into tension and then provide an initial impetus in the right direction when the rider sets off.

I claim:

1. A machine for utilizing muscular energy, the machine comprising means for supporting the body of an operator, an output member in the form of a spindle rotatable about a spindle axis, first operating means to be driven by the operator's legs to turn the spindle, and a set of handlebars which can be gripped by the operator's hands and are connected to a horizontal pivot axis through a parallelogram linkage so that they can be moved backwards and forwards in a vertical arc by torso and arm movement to turn the spindle, and a means for converting alternating directional movement of said parallelogram linkage into rotational movement of said spindle in a single predetermined direction, wherein movement of the first operating means is independent of movement of the second operating means, and wherein the spindle is driven by the second operating means during both backward and forward upper body movement.

2. A machine as claimed in claim 1, wherein the first operating means comprises a pair of pedals mounted at opposite ends of the spindle.

3. A machine as claimed in claim 1, wherein the second operating means includes a part-circular member mounted for rotation about an axis parallel to the spindle axis and connected to the handlebars for movement therewith, two independent drive chains connected between the ends of the part-circular member, and two sprockets mounted on the spindle, one chain passing over one sprocket in one direction and the other chain passing over the other sprocket in the other direction.

4. A machine as claimed in claim 3, wherein each chain is tensioned by a spring which extends between one end of the chain and the part-circular member.

5. A machine as claimed in claim 4, wherein each chain is also tensioned by an additional spring, at the end of the chain opposite to the first-mentioned spring, each additional spring being stronger than the associated first-mentioned spring.

6. A bicycle having a driven rear wheel and a steerable front wheel, first operating means to be driven by a rider's legs for driving the rear wheel and second operating means to be driven by upper body movement of the rider also to drive the rear wheel, wherein the second operating means comprises a set of handlebars which can be gripped by the operator's hands and are connected to a horizontal pivot axis through a parallelogram linkage so that they can be moved backwards and forward in a vertical arc by torso and arm movement to drive the rear wheel, and wherein movement of the first operating means is independent of movement of the second operating means during both backward and forward upper body movement.

7. A bicycle as claimed in claim 6, wherein a steering mechanism is provided between the handlebars and the front wheel, the mechanism including a cable linkage for transmitting steering movements from the handlebars to the front wheel.

8. A bicycle as claimed in claim 7, wherein the cable linkage comprises a pair of Bowden cables connected between a yoke on the handlebar stem and forks supporting the front wheel.

9. A bicycle as claimed in claim 7, wherein the cable linkage comprises a cable entrained around pulleys on the axes of the handlebar stem and on forks supporting the front wheel, and around pulleys mounted at the centre of the vertical arc of movement of the handlebars.

10. A bicycle as claimed in claim 6, in combination with a stand, the stand including means for supporting the bicycle in an upright position with at least the rear wheel out of contact with the ground, and means for providing resistance to rotation of the rear wheel.

* * * * *